(12) United States Patent
Agnew et al.

(10) Patent No.: US 11,380,924 B2
(45) Date of Patent: Jul. 5, 2022

(54) FUEL CELL SYSTEM

(71) Applicant: ROLLS-ROYCE PLC, London (GB)

(72) Inventors: Gerard D. Agnew, Uttoxeter (GB); Eric Dean, Mickleover (GB)

(73) Assignee: ROLLS-ROYCE PLC, London (GB)

( * ) Notice: Subject to any disclaimer, the term of this patent is extended or adjusted under 35 U.S.C. 154(b) by 143 days.

(21) Appl. No.: 15/758,324

(22) PCT Filed: Sep. 9, 2016

(86) PCT No.: PCT/GB2016/052789
§ 371 (c)(1),
(2) Date: Mar. 7, 2018

(87) PCT Pub. No.: WO2017/042574
PCT Pub. Date: Mar. 16, 2017

(65) Prior Publication Data
US 2018/0261863 A1 Sep. 13, 2018

(30) Foreign Application Priority Data
Sep. 9, 2015 (GB) .................................. 1515984.1

(51) Int. Cl.
*H01M 8/0662* (2016.01)
*H01M 8/0232* (2016.01)
(Continued)

(52) U.S. Cl.
CPC ....... *H01M 8/0662* (2013.01); *H01M 8/0232* (2013.01); *H01M 8/0243* (2013.01);
(Continued)

(58) Field of Classification Search
CPC ............. H01M 8/0662; H01M 8/0687; H01M 8/1246; H01M 8/04097; H01M 8/04022;
(Continued)

(56) References Cited

U.S. PATENT DOCUMENTS

| | | | | |
|---|---|---|---|---|
| 4,828,807 A | * | 5/1989 | Domesle | ................. F01N 3/022 423/213.7 |
| 5,460,637 A | * | 10/1995 | Connolly | ............. B01D 39/086 55/487 |

(Continued)

FOREIGN PATENT DOCUMENTS

| | | |
|---|---|---|
| DE | 102012219141 | 4/2014 |
| DE | 102012222331 | 6/2014 |

(Continued)

OTHER PUBLICATIONS

English translation of DE102012-222331 (Year: 2012).*
(Continued)

*Primary Examiner* — Michael L Dignan
(74) *Attorney, Agent, or Firm* — Dentons US LLP

(57) ABSTRACT

There is disclose a fuel cell system including at least one fuel cell and a duct to supply oxidant to the cathode of the at least one fuel cell. The duct includes at least one sorbent getter adapted to extract volatile species from the oxidant. The sorbent getter includes at least one member of the group consisting of magnesium oxide, calcium oxide and manganese oxide. The sorbent getter provides the advantage of extracting volatile species from the oxidant stream.

18 Claims, 6 Drawing Sheets

(51) Int. Cl.
  *H01M 8/0243* (2016.01)
  *H01M 8/04014* (2016.01)
  *H01M 8/04089* (2016.01)
  *H01M 8/1246* (2016.01)
  *H01M 8/12* (2016.01)

(52) U.S. Cl.
  CPC ... *H01M 8/04022* (2013.01); *H01M 8/04097* (2013.01); *H01M 8/0687* (2013.01); *H01M 8/1246* (2013.01); *H01M 2008/1293* (2013.01)

(58) Field of Classification Search
  CPC ............ H01M 8/0243; H01M 8/0232; H01M 2008/1293; F01N 3/0211; F01N 3/0215; B01D 71/028; B01D 71/024
  See application file for complete search history.

(56) References Cited

U.S. PATENT DOCUMENTS

| | | | | |
|---|---|---|---|---|
| 5,547,648 | A | * | 8/1996 | Buchanan ............... B01D 53/04 423/210 |
| 2005/0142398 | A1 | | 6/2005 | Browall et al. |
| 2008/0209898 | A1 | * | 9/2008 | Succi ..................... B01D 45/08 60/311 |
| 2014/0057184 | A1 | | 2/2014 | Pillai et al. |
| 2015/0030947 | A1 | | 1/2015 | Saunders et al. |

FOREIGN PATENT DOCUMENTS

| | | |
|---|---|---|
| JP | 2015-106445 | 6/2015 |
| JP | 2015-158969 | 9/2015 |
| KR | 10-2013-0096255 | 8/2013 |
| WO | 2008143831 | 11/2008 |
| WO | 2011101162 | 8/2011 |
| WO | 2014031622 | 2/2014 |

OTHER PUBLICATIONS

Ganesh, Ibram. "Fabrication of magnesium aluminate (MgAl2O4) spinel foams." Ceramics International 37 (2011) 2237-2245 (Year: 2011).*

Atkinson et al. "Mechanical Properties of Magnesia-Spinel Composites." J. Am. Ceram. Soc. 90 [8] 2489-2496 (2007) (Year: 2007).*

J. Andreas Schuler et al., "Mitigating Cr Contamination by Hot Air Filtering in Solid Oxide Fuel Cells," Electrochemical Solid-State Letters 14[12] B132-134 (2011).

* cited by examiner

FUEL CELL SYSTEM

There is disclosed a fuel cell system and method, more particularly, the fuel cell system and method are a solid oxide fuel cell (SOFC) system and method.

BACKGROUND

Fuel cells consist of an anode, a cathode and an electrolyte that allows ionic charge to flow between the anode and the cathode, while electrons are forced to take an external electrical path and thus provide an electric supply. Fuel cells are generally classified by the type of electrolyte used, for example, solid oxide (SOFCs), alkaline (AFCs), phosphoric acid (PAFCs), proton exchange membrane (PEMFCs) and molten carbonate (MCFCs), or by their operating temperature. SOFCs, for example, have operating temperatures of around 700° C. to 1000° C.

A fuel cell converts chemical energy from a fuel, Le, the reactant, into electricity through a chemical reaction with oxygen or another oxidizing agent, i.e. oxidant. Hydrogen is the most common fuel, but hydrocarbons such as natural gas and alcohols like methanol may also be used. A constant reactant stream and a constant oxidant stream are supplied to the fuel cell to sustain the chemical reaction and the generation of electricity. The fuel cell can produce electricity continually for as long as these inputs are supplied.

However, a known challenge with fuel cells is overcoming cathode poisoning. Cathode poisoning occurs when volatile species react with or condense on the cathode, causing deterioration in the performance of the cathode by condensing at the electrochemical sites and reducing the overall power of the fuel cell over time. Chromium has been identified as a species which produces cathode poisoning. One approach to reducing the amount of cathode poisoning in a fuel cell is to reduce the amount of chromium (Cr) species within the fuel cell system, by removing these at their source. The source of chromium has been identified in some systems as the metallic components and metallic interconnects. One method of reducing Cr is through the application of aluminized coatings on exposed surfaces of the metallic components and metallic interconnects within the fuel cell system and another method of reducing Cr is through the use of metallic components which form alumina surface layers rather than chromia surface layers.

US200510142398 discloses a method for reducing the effect of cathode poisoning due to chromium volatilization by continuously drying the cathode feed gas to low moisture levels. Power generation configurations that minimize the energy penalty associated with the cathode gas drying are also disclosed.

J. Andreas Schuler et al., Electrochemical Solid-State Letters 14[12] B132-134 (201 1) discloses Cr reduction by using an air filter, based on a $(La,Sr)CoO_3$-coated ceramic foam. The identification of the source of pollutant is critical when using a filter to capture Cr species, and the source of the particular system tested was identified as upstream of the SOFC. The Cr filter created a 7-fold decrease of the amount of Cr contaminating the cathode after the installation of the filter.

WO 2011/101162 discloses a method and system for purification of gas streams for solid oxide fuel cells. Inlet gas streams for a solid oxide cell operated in both electrolysis and fuel cell modes are purified by providing a scrubber in the gas stream at the inlet side of the first electrode of the solid oxide cell. The scrubber is formed from a selection of materials suitable for use as electrolytes and electrode materials.

WO2014/031622A1 discloses a fuel cell assembly comprising a fuel cell stack including a plurality of fuel cells, an incoming oxidizing gas flow path configured to deliver an oxidizing gas to the plurality of fuel cells, and a chromium-getter material located in the incoming oxidizing flow path. The fuel cell includes an electrolyte, a cathode electrode on a first side of the electrolyte, an anode electrode on a second side of the electrolyte, and a chromium-getter material on the cathode electrode to reduce Cr.

BRIEF SUMMARY OF THE DISCLOSURE

In accordance with a first aspect, there is provided a solid oxide fuel cell system, the solid oxide fuel cell system comprising at least one fuel cell and a duct to supply oxidant to the cathode of the at least one fuel cell, the duct comprising at least one sorbent getter adapted to extract volatile species from the oxidant, the sorbent getter comprising at least one member of the group consisting of magnesium oxide, calcium oxide and manganese oxide.

The benefit of a sorbent getter comprising at least one member group consisting of magnesium oxide, calcium oxide and manganese oxides is that they are particularly good at extracting volatile chromium and silica species from the air stream by reacting with volatile chromium (Cr) based species.

Optionally, the sorbent getter is porous. In an example, the pore size of the porous sorbent getter ranges from approximately 0.1 μm to approximately 100 μm. Preferably, the pore size of the porous absorbent getters is in the range from approximately 1 μm to approximately 10 μm.

The benefit of a porous sorbent getter is that it has a significantly enhanced accessible surface area versus non-porous sorbent getters.

In accordance with a further aspect, there is provided a solid oxide fuel cell system, the solid oxide fuel cell system comprising at least one fuel cell and a duct to supply oxidant to the cathode of the at least one fuel cell, the duct comprising at least one sorbent getter adapted to extract volatile species from the oxidant, the sorbent getter comprising at least one member of the group consisting of magnesium oxide, calcium oxide, manganese oxide, and magnesia magnesium aluminate (MMA) $MgO+MgAl_2O_4$ based material, and wherein the at least one sorbent getter is porous and wherein the pore size ranges from approximately 0.1 μm to approximately 100 μm.

Optionally, the sorbent getter is formed from a magnesia magnesium aluminate ($MgO+MgAl_2O_4$) based material, hereinafter denoted MMA. MMA materials are useful as structural components of high temperature fuel cell systems due to their ability to withstand the high operating temperatures of the fuel cell systems. MMA materials are adapted to have a coefficient of thermal expansion (CTE) similar to the CTE of the other components in the fuel cell system, which reduces the build-up of mechanical and thermal stresses in the fuel cell system.

Optionally, the MMA-based materials contain magnesium aluminate spinel with excess magnesia. Preferably the excess magnesia is on the surface of the MMA-based material.

Optionally, the sorbent getter is formed as a substantially planar structure.

The substantially planar structure may have substantially uniform opposed surfaces substantially devoid of apertures.

The substantially planar structure may be provided with a plurality of oxidant apertures. The oxidant apertures have a diameter ranging from approximately 0.1 mm to approximately 6 mm. Preferably, the oxidant apertures have a diameter ranging from approximately 0.3 mm to approximately 3 mm. The substantially planar structures may be arranged within the duct, in the direct flow path of the oxidant travelling through the duct, so that the oxidant is forced to pass through the sorbent getters.

The sorbent getters may be provided in pairs, substantially parallel to one another and arranged in flow series. Optionally, the pairs of sorbent getters are arranged so that the plurality of oxidant apertures of each sorbent getter are off-set relative to those of the adjacent sorbent getter.

The flow of the oxidant in the vicinity of a fuel cell stack of a fuel cell system is often at a low Reynolds number (i.e. laminar flow). A low Reynolds number flow of the oxidant stream results in the oxidant stream reaching a larger proportion of the fuel cell stack for a given mass flow of oxidant. However, the low Reynolds number regime in the channels and ducts of the fuel cell system introduces a challenge in achieving good mass transfer between the oxidant stream and the surface of the sorbent getter.

The off-set oxidant apertures provide a means of overcoming this challenge without introducing an unacceptably excessive pressure drop in the flow of the oxidant stream.

The benefit of the off-set oxidant apertures is that when the oxidant stream hits the first sorbent getter and is forced to pass through the oxidant apertures of the first sorbent getter, the oxidant apertures generate a series of impinging jets on the second sorbent getter. The oxidant stream then escapes through the oxidant apertures of the second sorbent getter. Within these impinging jets, the Reynolds number is locally increased and the form of the impingement causes a locally suppressed depth in the boundary layer associated with flow of the oxidant stream on the second sorbent getter.

Furthermore the spacing of the oxidant apertures is such that even when the flow has turned to flow over the surface of the second sorbent getter, it has effectively tripped and cannot form into a fully developed flow for most if not all of the distance that it flows over the surface of the second sorbent getter before flowing through the oxidant apertures in that second sorbent getter.

Preferably, the oxidant aperture spacing may be selected so that the flow over the surface of the second sorbent getter from the point of impingement on the second surface of the second sorbent getter to the oxidant apertures in the second sorbent getter is such that the flow does not form a full boundary layer or very little boundary layer.

Optionally, the sorbent getter comprises internal channels.

Optionally, the pair of sorbent getters are positioned such that the distance between them is 1 mm to 100 mm.

Optionally, the absorbent getters are positioned at an inlet duct.

Optionally, the absorbent getters are positioned at an oxidant recycle loop.

Optionally, the absorbent getters are positioned at an oxidant passage within a heat exchanger.

In accordance with a further aspect, there is provided a method for extracting chromium species from an oxidant stream in a solid oxide fuel cell system, the method comprising:

arranging an sorbent getter in an oxidant duct, the oxidant duct being arranged to supply oxidant to a cathode of at least one fuel cell, wherein the sorbent getter comprises at least one member of the group consisting of magnesium oxide, calcium oxide and manganese oxide; and supplying oxidant through the duct to the at least one fuel cell in the solid oxide fuel cell system.

In accordance with a further aspect, there is provided a method for extracting chromium species from an oxidant stream in a solid oxide fuel cell system, the method comprising:

arranging an sorbent getter in an oxidant duct, the oxidant duct being arranged to supply oxidant to a cathode of at least one fuel cell, wherein the sorbent getter comprises at least one member of the group consisting of magnesium oxide, calcium oxide, manganese oxide, and magnesia magnesium aluminate (MMA) $MgO+MgAl_2O_4$ based material, and wherein the at least one sorbent getter is porous and wherein the pore size ranges from approximately 0.1 µm to approximately 100 µm; and supplying oxidant through the duct to the at least one fuel cell in the solid oxide fuel cell system.

BRIEF DESCRIPTION OF THE DRAWINGS

Embodiments of the invention are further described hereinafter with reference to the accompanying drawings, in which.

DETAILED DESCRIPTION

A fuel cell stack is a plurality of fuel cells connected in series and/or in parallel.

Figure 1:
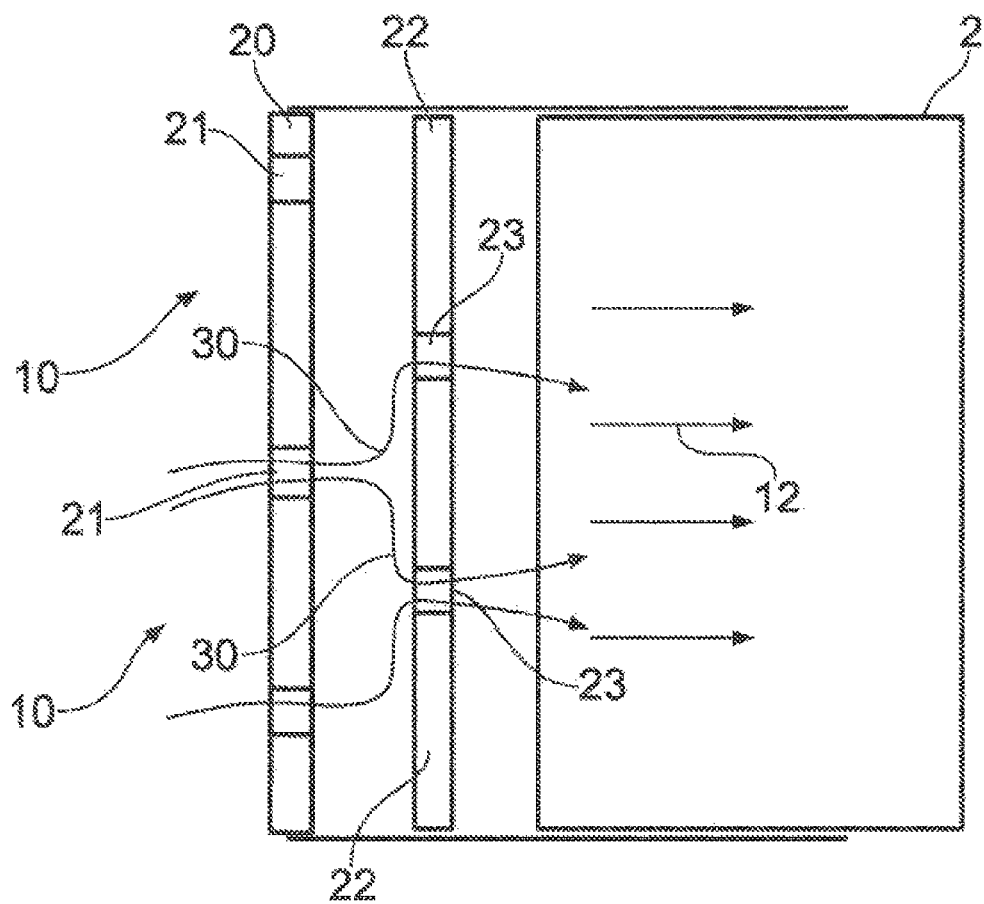
FIG. 1 shows a schematic of the flow of an oxidant stream through sorbent getters in an inlet duct of a fuel cell stack.

FIG. 1 shows the path of the inlet air stream 10 through the inlet duct 2 of the fuel cell stack. The flow regime in the vicinity of the fuel cell stack is typically at low Reynolds number. The inlet duct 2 of the fuel cell stack is provided with one or more sorbent getters 20, 22 and the sorbent getters 20, 22 are substantially planar structures, which have a plurality of air apertures 21, 23 respectively extending there-through. The sorbent getters 20, 22 are arranged to extend transversely across the inlet duct 2 substantially perpendicular to the flow direction of the inlet air stream 10. The sorbent getters 20, 22 are arranged in flow series within the inlet duct 2. The planes of the planar structure sorbent getters 20, 22 are arranged substantially perpendicular to the flow direction of the inlet air stream 10. The inlet air stream 10 hits the first sorbent getter 20 and passes through the air apertures 21 of the first sorbent getter 20. The air apertures 21 create jets of air which hit the second sorbent getter 22. The air apertures 23 of the second sorbent getter 22 are offset from the air apertures 21 of the first sorbent getter 20. The offset air aperture 21, 23 arrangement creates impingement and suppresses the formation of a boundary layer 30 on the second sorbent getter 22. The depth of the boundary layer 30 is reduced by the impinging jets of air because the Reynolds number of the air stream is locally increased over the surface of the second sorbent getter 22. The spacing of the air apertures 21, 23 is such that when the air stream reaches the second sorbent getter 22, the air stream 10 is redirected to flow over the surface of the second sorbent getter 22, and does not form into a fully developed flow for most, if not all of the distance that it flows over the surface of the second sorbent getter 22 before passing through air apertures 23 in the second sorbent getter 22.

The first and second sorbent getters 20, 22 may be separate planar structures. The air apertures 21, 23 are formed in the separate planar structures by drilling, e.g. laser drilling or other suitable process. Alternatively, the first and second sorbent getters 20, 22 may be parallel side walls of a planar hollow tube or the parallel side walls of a multi-channel tube. The air apertures 21, 23 are formed in the side walls of the hollow tube, or multi-channel tube, by drilling, e.g. laser drilling or other suitable process.

The size of the air apertures 21, 23 and the spacing of the air apertures 21, 23 relative to each other are selected such that jetting in the air flow is sufficiently dissipated over the short distance between the first and second sorbent getters 20, 22. The sorbent getters 20, 22 are typically positioned close to the fuel cell stack to minimise the dimensions of the inlet duct 2 and fuel cell system. Furthermore, the first and second sorbent getters 20, 22 are configured to perform an air stream flow straightening function that would otherwise require separate components to achieve.

Volatile chromium (VI) oxide and chromium (VI) oxy-hydroxide species present in the inlet air stream 10 are known to react with the cathodes of the fuel cells within the fuel cell stack causing deterioration in the performance of the cathodes by condensing at the electrochemical sites and reducing the overall power of the fuel cells and fuel cell stack over time. Typically, insulation materials can exhibit volatility of silicon hydroxide and oxyhydroxide species in the presence of moist air. Reducing the concentration of the chromium and silica contaminant species from the air stream 10 by providing sorbent getters 20, 22 within the inlet duct 2 of the fuel cell stack to remove chromium and silica species from the air stream 10, serves to extend the lifetime of the fuel cells and fuel cell stack by reducing cathode degradation.

The sorbent getters 20, 22 may comprise one or more of magnesium oxide, calcium oxide and manganese oxide and in this particular example the sorbent getters 20, 22 comprise $MgO+MgAl_2O_4$ (MMA), e.g. magnesia and magnesium aluminate. The separate planar structures of the sorbent getters 20, 22 may be formed by extruding the green MMA and then sintering and similarly the planar hollow tube or multi-channel tube may be formed by extruding the green MMA and sintering. The MMA tubes may be coated with an additional layer of magnesia. Alternatively, the sorbent getters 20, 22 may be metal sheets with a layer of magnesia, calcium oxide or manganese oxide.

Using MMA-based materials enables formation of a wider range of geometries than the simple MgO-based ceramics at a reasonable cost. It is well known to those skilled in the art that it is difficult to form magnesia components.

The sorbent getters thus have dual functionality: the sorbent getters reduce the quantity of volatile species in the air stream, and the sorbent getters redirect the flow of the air stream, thus acting as flow straighteners. The dual functionality reduces the overall pressure drop for air streams flowing through the fuel cell stack, which directly results in operating cost savings because less power is required to operate blower-fed fuel cells. The use of a first and a second sorbent getter improves the mass transfer of the air stream without creating a significant pressure drop across the sorbent getters. For fuel cells cooled by partially recycled flows, sorbent getters lower the pressure drop around the cathode recycle loop, permitting the use of cathode ejectors that develop low pressure drops and need lower primary air pressure. This integration also saves overall volume and weight.

Figure 2:
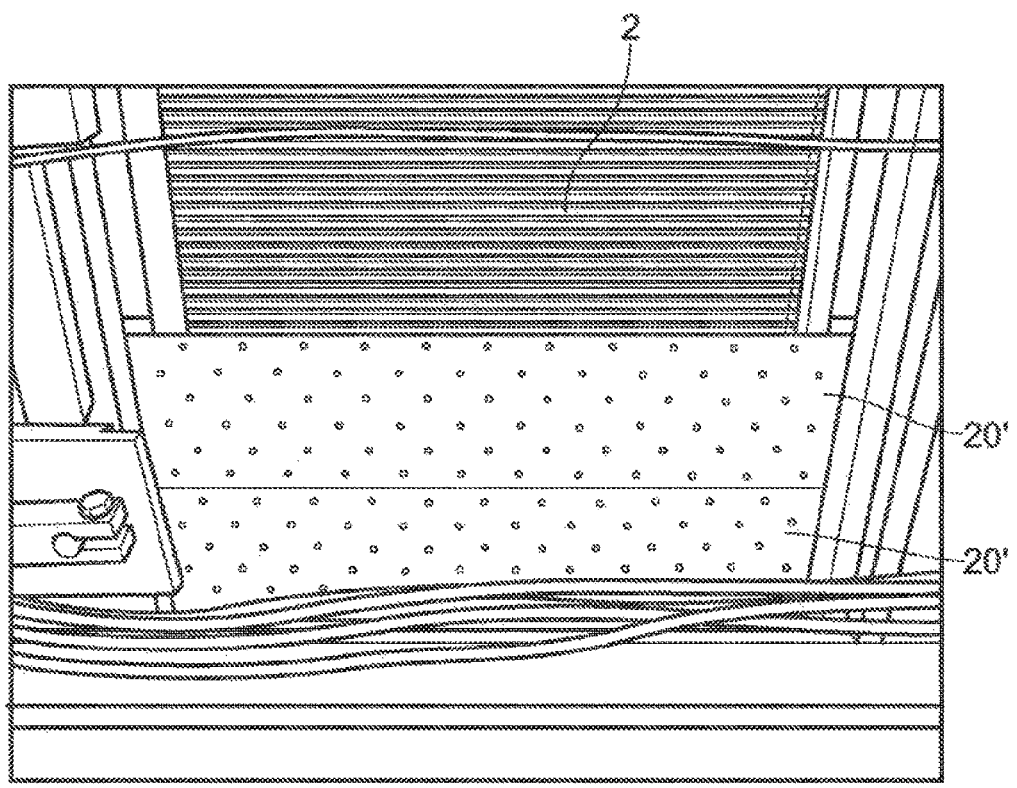
FIG. 2 shows a planar getter installed in the oxidant stream in an inlet duct of a fuel cell stack.

FIG. 2 shows a porous sorbent getter 20 with a high concentration of MgO on the surface of the sorbent getter 20. The sorbent getter 20 is positioned in the inlet duct 2 of the air stream of a solid oxide fuel cell stack. The sorbent getters 20 are formed in sections 20' and a number of sections 20' are required depending on the dimensions of the intake duct 2 of the fuel cell stack of the fuel cell system. Alternatively the sorbent getter 20 may be a single piece which extends across the whole of the cross-sectional area of the inlet duct 2.

Figure 3:
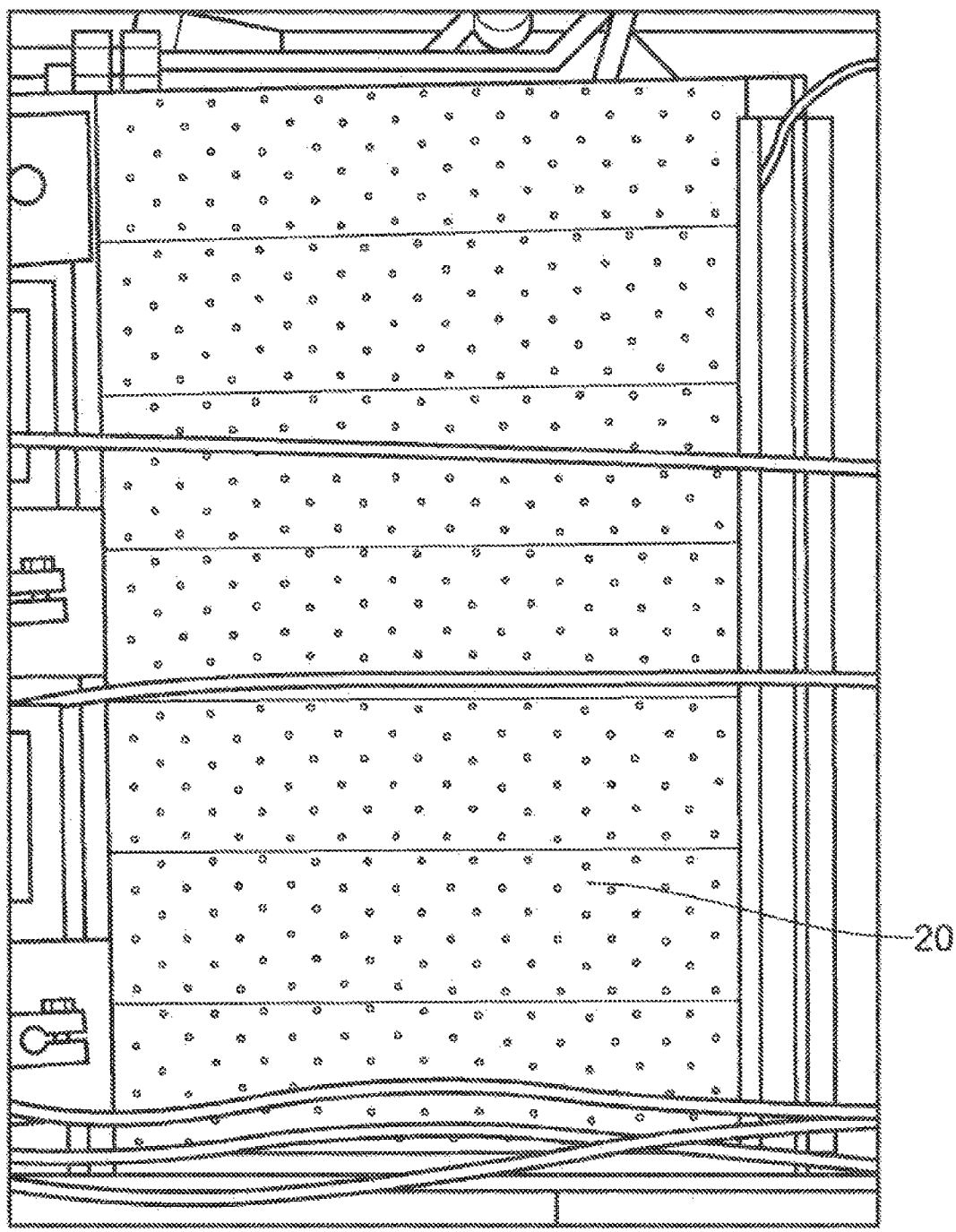
FIG. 3 shows a plurality of planar getters arranged in a side by side arrangement to cover the inlet duct of a fuel cell stack.

FIG. 3 shows an installed sorbent getter 20 covering the whole of the cross-sectional area of the inlet duct 2 of the air stream 10 of a solid oxide fuel cell stack.

Figure 4:
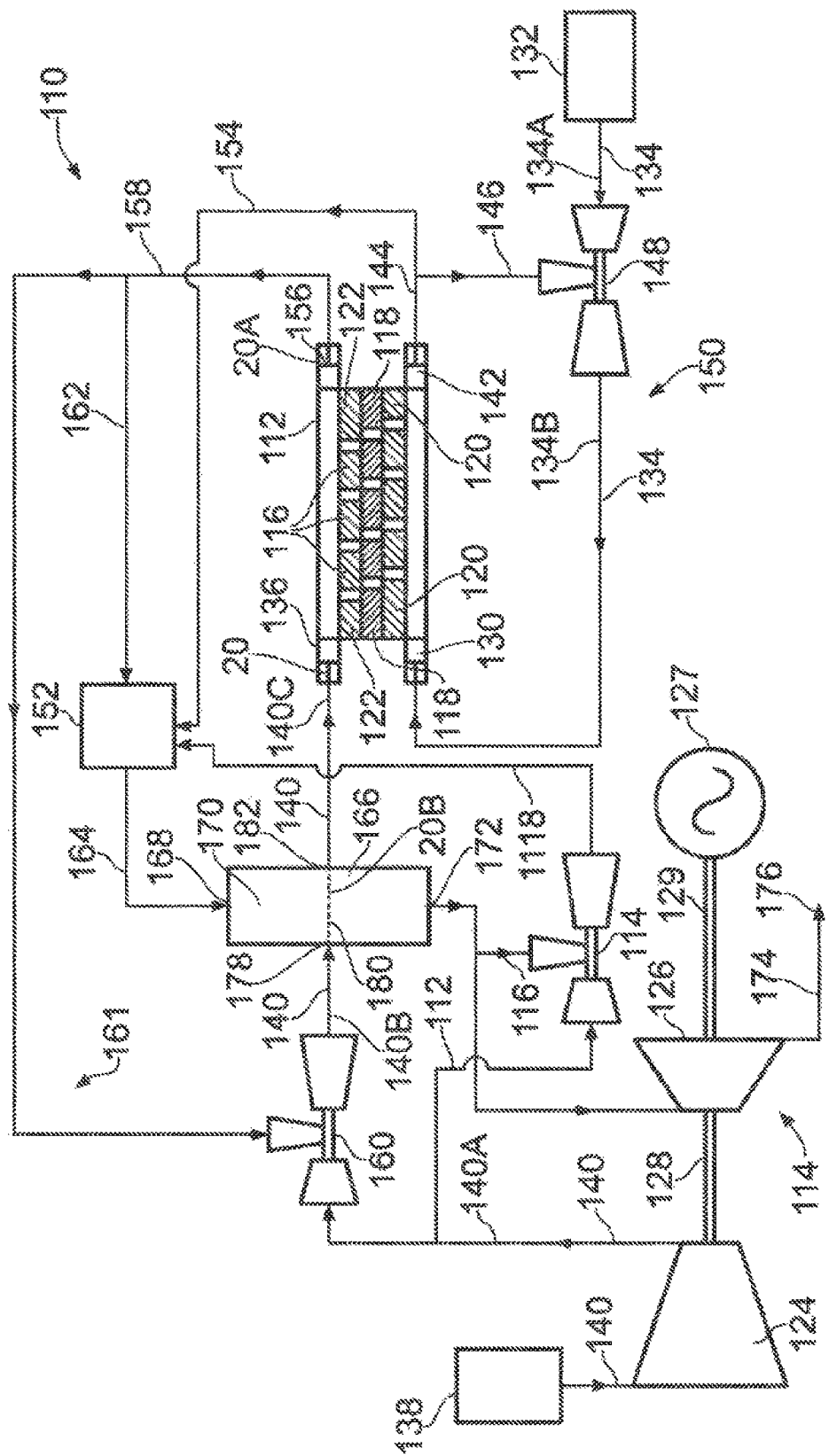
FIG. 4 shows a representation of the fuel cell system.

FIG. 4 schematically shows a fuel cell system comprising a sorbent getter comprising a strip of MMA ($MgO+MgAl_2O_4$) 20 positioned in the inlet duct of the solid oxide fuel cell stack 112 of the solid oxide fuel cell system 110. In this particular arrangement the sorbent getter 20 is positioned between a heat exchanger 166 and an oxidant supply manifold 136 in the oxidant supply inlet duct to the fuel cell stack 112. Alternatively the sorbent getter 20A may be positioned between an oxidant outlet manifold 156 and a cathode ejector 160 in a cathode recycle loop 161 or recycle duct 158. In another arrangement the sorbent getter 20B may be provided in a passage(s) 180 within the heat exchanger 166.

The solid oxide fuel cell stack 112 comprises a plurality of solid oxide fuel cells 1 16, each of which comprises an electrolyte 118, an anode 120 and a cathode 122.

The gas turbine engine 114 comprises a compressor 124 and a turbine 126, and the turbine 126 is arranged to drive the compressor 124 via a shaft 128. The turbine 126 of the gas turbine engine 114 is also arranged to drive an electrical generator 127 via a shaft 129.

The anodes 120 of the solid oxide fuel cells 1 16 are supplied with a fuel, for example hydrogen, by a fuel manifold 130 and a fuel supply 132, for example hydrogen, is arranged to supply fuel to the fuel manifold 130 via duct 134. The cathodes 122 are supplied with an oxidant, for example oxygen, air etc, by an oxidant manifold 136 and an oxidant supply 138 is arranged to supply oxidant to the oxidant manifold 136 via a duct 140. The compressor 124 is located in the duct 140 and pressurises the supply of oxidant to the oxidant manifold 136.

The anodes 120 are provided with an unused fuel collection manifold 142 into which unused fuel is discharged. The unused fuel collection manifold 142 is connected to the duct 134 via ducts 144 and 146 such that a portion of the unused fuel is supplied, recirculated, to the fuel manifold 130. A fuel ejector 148 is provided to induce the supply, recirculation, of unused fuel from the unused fuel collection manifold 142 to the fuel manifold 130. The ducts 144, 146 and the fuel ejector 148 form means 150 to supply, recirculate, unused fuel from the anodes 120 of the solid oxide fuel cells 116 back to the anodes 120 of the solid oxide fuel cells 1 16. The fuel ejector 148 pressurises the unused fuel and mixes the unused fuel with the fuel supplied by the fuel supply 132 through the duct 134 to the fuel manifold 130. Only fuel from the fuel supply 132 flows in a first portion 134A of the duct 134 between the fuel supply 32 and the fuel ejector 148. The fuel from the fuel supply 132 and the portion of the unused fuel from the anodes 120 of the solid oxide fuel cells 1 16 after mixing by the fuel ejector 148 is supplied through a second portion 134B of the duct 134 to the fuel manifold 130.

The unused fuel collection manifold 142 is also connected to a combustor 152 via the duct 144 and a further duct 154 such that a second portion of the unused fuel is supplied to the combustor 152.

The cathodes 122 are provided with an unused oxidant collection manifold 156 into which unused oxidant is discharged. The unused oxidant collection manifold 156 is connected to the duct 140 via duct 158 such that a portion of the unused oxidant is supplied, recirculated, to the oxidant manifold 136. An oxidant ejector 160 is provided to induce the supply, recirculation, of unused oxidant from the unused oxidant collection manifold 156 to the oxidant manifold 136. The ducts 140 and 158 and the oxidant ejector 160 form means 161 to supply, recirculate, unused oxidant from the cathodes 122 of the solid oxide fuel cells 1 16 back to the cathodes 122 of the solid oxide fuel cells 1 16. The oxidant ejector 160 pressurises the unused oxidant and mixes the unused oxidant with the oxidant supplied by the compressor 124 through the duct 140 to the oxidant manifold 136.

The unused oxidant collection manifold 156 is connected to the combustor 152 via the duct 158 and a further duct 162 such that a second portion of the unused oxidant is supplied to the combustor 152. The second portion of unused fuel supplied to the combustor 152 is burnt in the second portion of the unused oxidant supplied to the combustor 152 to produce hot exhaust gases. The hot exhaust gases produced in the combustor 152 are arranged to flow through a duct 164 to a heat exchanger 166. The hot exhaust gases are supplied to a first inlet 168 of the heat exchanger 166 and flow thought a first path 170 within the heat exchanger 166 to a first outlet 172 of the heat exchanger 166. The hot exhaust gases are then supplied from the first outlet 172 of the heat exchanger 166 to the turbine 126 through a duct. The hot exhaust gases drive the turbine 126 and then the hot exhaust gases flow through a duct 174 and are discharged through an exhaust 176. It may be possible to provide a recuperator in the duct 174 downstream of the turbine 126.

The oxidant from the compressor 124 and the portion of the unused oxidant from the cathodes 122 of the solid oxide fuel cells 116 after mixing by the oxidant ejector 160 is supplied through a second portion 140B of the duct 140 to a second inlet 178 of the heat exchanger 166 and flows through a second flow path 180 within the heat exchanger 166 to a second outlet 182 of the heat exchanger 166. The oxidant from the compressor 124 and the portion of the unused oxidant from the cathodes 122 of the solid oxide fuel cells 1 16 is then supplied from the second outlet 182 of the heat exchanger 166 to the oxidant manifold 136 via a third portion 140C of the duct 140. Only oxidant from the compressor 124 flows in a first portion 140A of the duct 140 between the compressor 124 and the oxidant ejector 160.

Thus, the hot exhaust gases from the combustor 152 flowing through the first flow path 170 within the heat exchanger 166 heats the oxidant from the oxidant supply 138 and the unused oxidant from the cathodes 122 flowing to the cathodes 122 flowing through the second flow path 180 within the heat exchanger 166.

The solid oxide fuel cell system 1 10 includes a compressor 124 arranged to supply a portion of the oxidant to the combustor 152 and the heat exchanger 166 is arranged to supply a portion of the combustor 152 exhaust gases from the first outlet 172 of the heat exchanger 166 to the combustor 152. In more detail a portion of the oxidant flowing through the first portion 140A of the duct 140 from the compressor 124 is supplied to a duct 1 12. The duct 112 supplies the portion of oxidant to the primary inlet of an ejector 1 14. The portion of the combustor 152 exhaust gases leaving the first outlet 172 of the heat exchanger 166 is supplied through a duct 1 16 to the secondary inlet of the ejector 1 14. The outlet of the ejector 1 14 is arranged to supply the portion of the oxidant from the compressor 124 and the portion of the exhaust gases from the first outlet 172 of the heat exchanger 166 to the combustor 152 through a duct 1 118. The duct 1 118 may be arranged to supply the portion of the oxidant from the compressor 124 and the portion of the exhaust gases from the first outlet 172 of the heat exchanger 166 to the combustor 152 with the unused oxidant in duct 162. This arrangement reduces the temperature at the inlet to the heat exchanger 166, e.g. and the outlet of the combustor 152, without reducing the heat transfer to the cool oxidant in the second portion 140B of the duct 140. The ejector 1 14 is used as a means for recycling exhaust gases from the combustor 152 back to the combustor 152 using the portion of oxidant supplied by the compressor 124.

Figure 5:
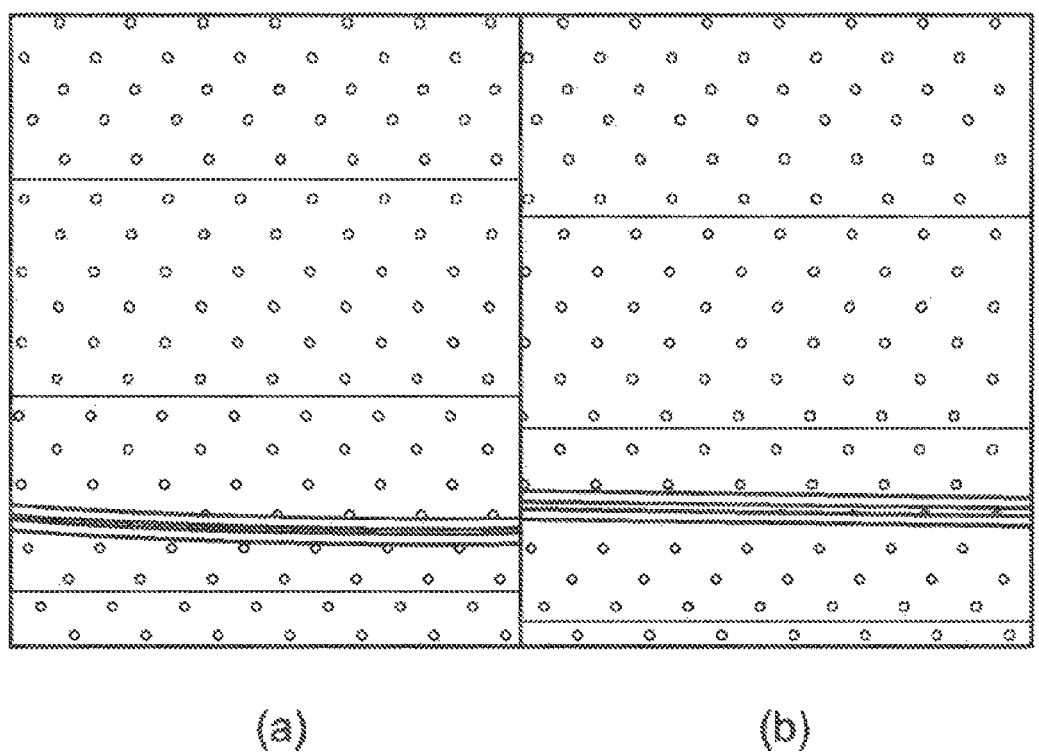
FIG. 5 (a) shows a planar getter prior to use, and (b) shows a planar getter after use.

Following 270 hours of operation of the fuel cell system 1 10 the MMA sorbent getters show significant discoloration, as shown in FIGS. 5(a) and (b). Analysis of MMA sorbent getters placed in the inlet duct 2 of the solid oxide fuel cell stack 1 10 showed the following Cr and Si capture: after 960 hours of a wet cycle (where some steam is present in the air stream), the sorbent getter had a surface composition of 26.8% Si, and 4.4% Cr; after 520 hours of a dry closed cycle (where steam present in the air stream is removed prior to flowing through the fuel cell), the sorbent getter has a surface composition of 0.6 wt. % Si, and 1.1 wt. % Cr.

Figure 6:
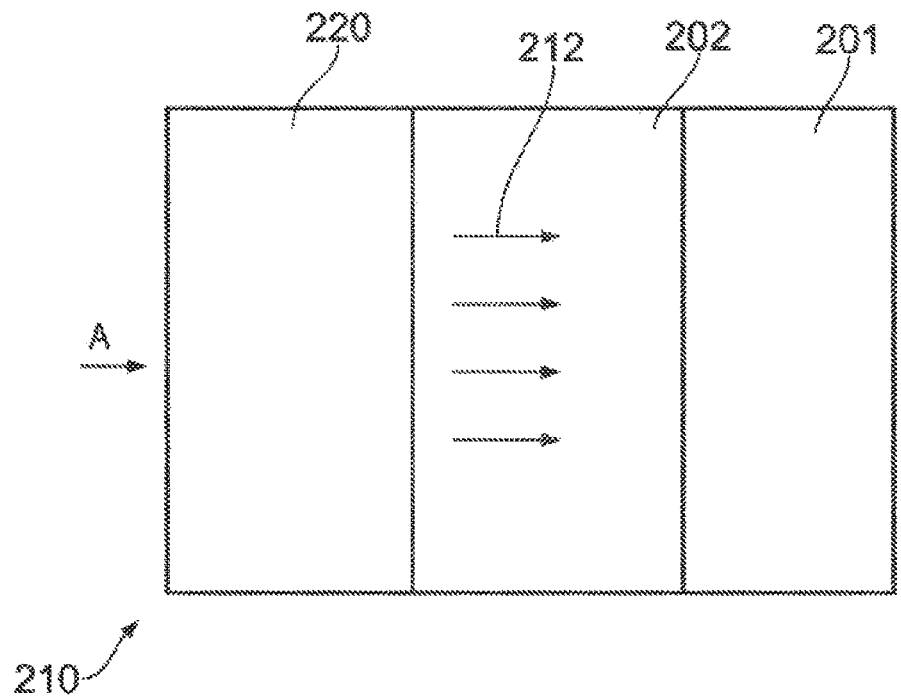
FIG. 6 shows an alternative schematic of the flow of an oxidant stream through sorbent getters in an inlet duct of a fuel cell stack.
Figure 7:
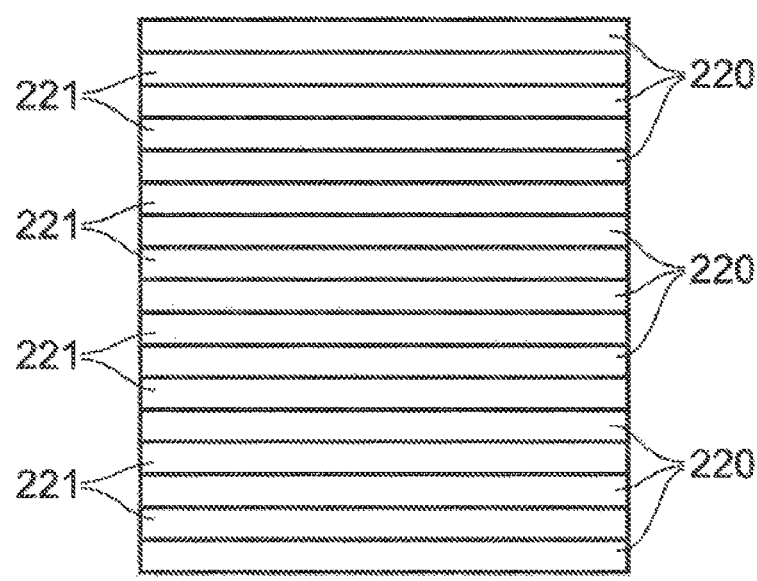
FIG. 7 shows a view in the direction of arrow A in FIG. 6.

FIGS. 6 and 7 show an alternative path of the inlet air stream 210 through the inlet duct 202 of the fuel cell stack 201. The inlet duct 202 of the fuel cell stack 201 is provided with one or more sorbent getters 220 and the sorbent getters 220 are substantially planar structures. The sorbent getters 220 are arranged to extend transversely across the inlet duct 202. The sorbent getters 220 are arranged in parallel across the inlet duct 202. The planes of the planar structure sorbent getters 220 are arranged substantially parallel to the flow direction of the inlet air stream 210. The planes of the planar structure sorbent getters 220 are arranged horizontally in this example. The sorbent getters 220 are spaced apart to form a number of, vertically, spaced apart parallel flow passages 221 to the fuel cell stack 201. In another alternative arrangement the planes of the planar structure sorbent getters are arranged vertically and are horizontally spaced apart to form a number of, horizontally, spaced apart parallel flow passages to the fuel cell stack. In another alternative arrangement the planes of the planar structure sorbent getters mat be arranged diagonally and the flow passages diagonally spaced apart. The planar structure sorbent getters may be sheets, tubes or multi-channel tubes of MMA as discussed previously. The MMA tubes may be coated with an additional layer of magnesia. Alternatively, the planar structures may be metal sheets with a layer of magnesia, calcium oxide or manganese oxide. The sorbent getters 220 do not require oxidant apertures because the flow passages 221 enable the flow of oxidant to the solid oxide fuel cell stack 201.

Although the description has referred to providing the sorbent getter in the oxidant intake duct at the inlet to the solid oxide fuel cell stack, the sorbent getter may be provided at other suitable locations within the oxidant supply for the solid oxide fuel cell stack. The sorbent getter may be located at the oxidant outlet of the solid oxide fuel cell stack. Alternatively, or additionally, the sorbent getter may be located in and across the duct of the cathode/oxidant recycle loop. Alternatively, or additionally, the sorbent getter may be located in the passages of the heat exchanger supplying oxidant to the solid oxide fuel cell stack. The sorbent getter may define a portion or the whole of the inlet duct or a portion or the whole of the recycle duct. The sorbent getter may be provided as a coating on a portion or the whole of the inlet duct or a portion or the whole of the recycle duct.

Although the planar structures have been described as comprising MMA it may be equally possible for the planar structures to comprise a metal plate having a coating of the sorbent getter. The coating of sorbent getter may be applied by plasma spraying, thermal spraying, slurry coating or other suitable process.

The sorbent getter may be porous, for example the porous getter may comprise a honeycomb structure produced by extruding the green MMA and sintering.

Although the description has referred to supplying air to the cathodes of the fuel cells it is equally possible to supply air or other suitable oxidant.

It will be clear to a person skilled in the art that features described in relation to any of the embodiments described above can be applicable interchangeably between the different embodiments. The embodiments described above are examples to illustrate various features of the invention Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:
1. A solid oxide fuel cell system, the solid oxide fuel cell system comprising:
at least one fuel cell and a duct to supply oxidant to the cathode of the at least one fuel cell, the duct comprising a first sorbent getter and second sorbent getter located adjacent each other, and each having a plurality of oxidant apertures, each sorbent getter adapted to extract volatile species from the oxidant, each sorbent getter comprising at least one member of the group consisting of magnesium oxide, calcium oxide, manganese oxide and magnesia magnesium aluminate (MMA) MgO+ MgAl$_2$O$_4$ based material,
wherein each sorbent getter is porous with a pore size ranging from approximately 0.1 μm to approximately 100 μm,
wherein an oxidant aperture spacing for the plurality of oxidant apertures of each of the first and second sorbet getters and an oxidant aperture size for the plurality of oxidant apertures of each of the first and second sorbet getters are selected to dissipate jetting in the air stream flow over a separation distance between the first and second sorbet getters,
wherein an oxidant aperture spacing for the plurality of oxidant apertures of the second sorbent getter is selected so that the flow over a surface of the second sorbent getter from a point of impingement on a second surface of the second sorbent getter to one of the plurality of oxidant apertures in the second sorbent getter does not form a full boundary layer, and
wherein the plurality of oxidant apertures of the first sorbent getter are arranged in a uniform pattern with a majority of the apertures being substantially equidistant to at least three other apertures and the plurality of oxidant apertures of the second sorbent getter are arranged in a similar uniform pattern offset from the uniform pattern of first sorbent getter, such that the plurality of oxidant apertures of the second sorbent getter are offset from the plurality of oxidant apertures of the first sorbent getter.

2. A solid oxide fuel cell system as claimed in claim 1, wherein the pore size of the porous sorbent getters is in the range from approximately 1 μm to approximately 10 μm.

3. A solid oxide fuel cell system as claimed in claim 1, wherein the MMA based material is configured to have a coefficient of thermal expansion, CTE, complementary to a CTE of the other components in the fuel cell.

4. A solid oxide fuel cell system as claimed in claim 1, wherein the MMA-based material contains magnesium aluminate spinel with excess magnesia.

5. A solid oxide fuel cell system as claimed in claim 4, wherein the excess magnesia is located on an exposed surface of each sorbent getter.

6. A solid oxide fuel cell system as claimed in claim 1, wherein at least one sorbent getter is formed as a substantially planar structure.

7. A solid oxide fuel cell system as claimed in claim 6, wherein the substantially planar structure has substantially uniform opposed surfaces substantially devoid of apertures.

8. A solid oxide fuel cell system as claimed in claim 6, wherein the substantially planar structure is provided with a plurality of oxidant apertures.

9. A solid oxide fuel cell system as claimed in claim 8, wherein the oxidant apertures have a diameter ranging from approximately 0.1 mm to approximately 6 mm.

10. A solid oxide fuel cell system as claimed in claim 8, wherein the oxidant apertures have a diameter ranging from approximately 0.3 mm to approximately 3 mm.

11. A solid oxide fuel cell system as claimed in claim 6, wherein the substantially planar structure is arranged within the duct, in the direct flow path of the oxidant travelling through the duct, so that oxidant is forced to pass through the substantially planar structure.

12. A solid oxide fuel cell system as claimed in claim 8, further comprising additional sorbent getters provided in pairs, wherein all of the sorbent getters are arranged substantially parallel to one another in flow series.

13. A solid oxide fuel cell system as claimed in claim 12, wherein each pair of sorbent getters is arranged so that the plurality of oxidant apertures of one sorbent getter are off-set relative to those of an adjacent sorbent getter.

14. A solid oxide fuel cell system as claimed in claim 12, wherein for each pair the sorbent getters are positioned such that the separation distance between them is 1 mm to 100 mm.

15. A solid oxide fuel cell system as claimed in claim 1, wherein at least one sorbent getter comprises internal channels.

16. A solid oxide fuel cell system as claimed in claim 1, wherein at least one sorbent getter is positioned at an inlet duct.

17. A solid oxide fuel cell system as claimed in claim 1, wherein at least one sorbent getter is positioned at an oxidant recycle loop.

18. A solid oxide fuel cell system as claimed in claim 1, wherein at least one sorbent getter is positioned at an oxidant passage within a heat exchanger.

* * * * *